United States Patent
Kumagai et al.

(10) Patent No.: US 11,550,034 B2
(45) Date of Patent: Jan. 10, 2023

(54) TARGET INSTRUMENT AND SURVEYING SYSTEM

(71) Applicant: TOPCON Corporation, Tokyo-to (JP)

(72) Inventors: Kaoru Kumagai, Tokyo-to (JP); Minoru Chiba, Tokyo-to (JP); Akinobu Sugiura, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 423 days.

(21) Appl. No.: 16/799,967

(22) Filed: Feb. 25, 2020

(65) Prior Publication Data
US 2020/0271758 A1 Aug. 27, 2020

(30) Foreign Application Priority Data
Feb. 26, 2019 (JP) .............................. JP2019-033208

(51) Int. Cl.
*G01S 7/48* (2006.01)
*G01S 17/08* (2006.01)

(52) U.S. Cl.
CPC .......... *G01S 7/4808* (2013.01); *G01S 7/4804* (2013.01); *G01S 17/08* (2013.01)

(58) Field of Classification Search
CPC ...... G01S 7/4808; G01S 7/4804; G01S 17/08; G01C 15/06; G01C 1/04
See application file for complete search history.

(56) References Cited

U.S. PATENT DOCUMENTS

| 11,193,765 B2 * | 12/2021 | Ohtomo ............... G01C 15/002 |
| 2001/0019101 A1 | 9/2001 | Ohtomo et al. |
| 2014/0156219 A1 * | 6/2014 | Soubra ................... G01S 19/53 |
| | | 702/150 |
| 2015/0077545 A1 | 3/2015 | Ohtomo et al. |

(Continued)

FOREIGN PATENT DOCUMENTS

| JP | 2001-241950 A | 9/2001 |
| JP | 2015-59760 A | 3/2015 |

(Continued)

OTHER PUBLICATIONS

European communication dated Jul. 24, 2020 in corresponding European patent application No. 20159052.8.

*Primary Examiner* — Mohammad K Islam
(74) *Attorney, Agent, or Firm* — Nields, Lemack & Frame, LLC

(57) ABSTRACT

Provided is a target instrument including a pole, a prism provided on the pole, and a terminal device provided on the pole, wherein the terminal device comprises an image pickup module, a tilt sensor which detects tilts in two axial directions, and an arithmetic control module, wherein the image pickup module acquires an image which includes a reference object, the tilt sensor detects a tilt angle of a target instrument, and the arithmetic control module calculates a tilt direction of the target instrument from a position of the reference object in the image, calculates a tilt direction of the target instrument based on tilt angles in the two axial directions of the tilt sensor, acquires a deviation between the (Continued)

two tilt directions, and corrects the tilt angles in the two axial directions of the tilt sensor to tilt angles in directions parallel to an optical axis of the image pickup module and orthogonal to the optical axis based on the deviation.

4 Claims, 3 Drawing Sheets

(56) References Cited

U.S. PATENT DOCUMENTS

| | | | |
|---|---|---|---|
| 2016/0109560 A1 | 4/2016 | Yanobe | |
| 2017/0061605 A1* | 3/2017 | Nagashima | G01C 15/002 |
| 2017/0356741 A1* | 12/2017 | Nishita | G01C 3/04 |
| 2018/0217263 A1 | 8/2018 | Ohtomo et al. | |
| 2020/0142031 A1* | 5/2020 | Nishita | G01C 15/02 |

FOREIGN PATENT DOCUMENTS

| | | |
|---|---|---|
| JP | 2016-45002 A | 4/2016 |
| JP | 2018-124121 A | 8/2018 |

* cited by examiner

TARGET INSTRUMENT AND SURVEYING SYSTEM

BACKGROUND OF THE INVENTION

The present invention relates to a target instrument which is erected on a measuring point and has a prism as an object to be measured, and to a surveying system which measures the measuring point via the measurement of the prism.

In case of measuring a measuring point, a target instrument having a prism provided on a support pole is used. When the target instrument is erected on the measuring point and the prism is measured by a surveying instrument, the measuring point is measured. Further, in case of using the surveying instrument with a tracking function, the target instrument is sequentially moved to the different measuring points, the prism is tracked by the surveying instrument, and the measuring points are sequentially measured.

In this case, in order to accurately measure a measuring point, the prism must be placed vertically above the measuring point. Usually, the prism is provided on an upper part of the support pole, and a worker installs a lower end of the support pole on the measuring point and vertically supports the support pole. Further, to enable vertically supporting the support pole, an air bubble tube is provided in the target instrument, and the worker confirms whether the support pole, i.e., the target instrument is vertical with the use of the air bubble tube.

In this case, whether the target instrument is supported in a vertical state or stably supported, is dependent upon the worker's skill level or concentration, further there is also a problem which an error becomes considerable in a case where a distance from the lower end of the support pole to the prism increases.

SUMMARY OF THE INVENTION

It is an object of the present invention to provide a target instrument and a surveying system which are configured to highly accurately enable the measurement of a measuring point even if the target instrument is not accurately vertically supported or without requiring a worker's skill or concentration for the support of the target instrument.

To attain the object as described above, a target instrument according to the present invention comprises a pole which has a ferrule part at a lower end part thereof, a prism which is provided on the pole and provided at a known distance from a lower end of the pole, and a terminal device provided on the pole, wherein the terminal device comprises an image pickup module which is fixed with a known attitude with respect to the pole, a tilt sensor which detects tilts in two axial directions which are orthogonal to each other and one of which axial directions is parallel to an optical axis of the image pickup module, and an arithmetic control module, wherein the image pickup module is configured to acquire an image which includes a reference object, the tilt sensor is configured to detect a tilt angle of a target instrument with respect to the verticality, and the arithmetic control module is configured to calculate a tilt direction of the target instrument from a position of the reference object in the image, to calculate a tilt direction of the target instrument based on tilt angles in the two axial directions of the tilt sensor, to acquire a deviation between the tilt direction of the target instrument acquired from the image and the tilt direction acquired from the tilt sensor, and to correct the tilt angles in the two axial directions of the tilt sensor to tilt angles in directions parallel to the optical axis of the image pickup module and orthogonal to the optical axis based on the deviation.

Further, in the target instrument according to a preferred embodiment, an image pickup element of the image pickup module has a coordinate system for identifying a position in the image pickup element, and one of the coordinate axes of the coordinate system is orthogonal or parallel to an axis of the pole.

Further, in the target instrument according to a preferred embodiment, the arithmetic control module is configured to calculate a displacement of the prism in a horizontal direction with respect to a lower end position based on the corrected tilt angles and the distance from the lower end of the pole.

Further, in the target instrument according to a preferred embodiment, the terminal device is a smartphone.

Furthermore, a surveying system according to the present invention comprises the target instrument and a surveying instrument with a tracking function, wherein the surveying system is configured to measure a lower end of the target instrument based on a measurement result of the prism by the surveying instrument, a tilt angle of the target instrument, and a distance from the lower end of the pole to the prism.

According to the present invention, the target instrument comprises a pole which has a ferrule part at a lower end part thereof, a prism which is provided on the pole and provided at a known distance from a lower end of the pole, and a terminal device provided on the pole, wherein the terminal device comprises an image pickup module which is fixed with a known attitude with respect to the pole, a tilt sensor which detects tilts in two axial directions which are orthogonal to each other and one of which axial directions is parallel to an optical axis of the image pickup module, and an arithmetic control module, wherein the image pickup module is configured to acquire an image which includes a reference object, the tilt sensor is configured to detect a tilt angle of a target instrument with respect to the verticality, and the arithmetic control module is configured to calculate a tilt direction of the target instrument from a position of the reference object in the image, to calculate a tilt direction of the target instrument based on tilt angles in the two axial directions of the tilt sensor, to acquire a deviation between the tilt direction of the target instrument acquired from the image and the tilt direction acquired from the tilt sensor, and to correct the tilt angles in the two axial directions of the tilt sensor to tilt angles in directions parallel to the optical axis of the image pickup module and orthogonal to the optical axis based on the deviation. As a result, a measurement worker is freed from a work to vertically erect the target instrument, the workability is improved, and a measurement accuracy is enhanced.

Further, according to the present invention, the surveying system comprises the target instrument and a surveying instrument with a tracking function, wherein the surveying system is configured to measure a lower end of the target instrument based on a measurement result of the prism by the surveying instrument, a tilt angle of the target instrument, and a distance from the lower end of the pole to the prism. As a result, a measurement worker is freed from a work to vertically erect the target instrument, the workability is improved, and a measurement accuracy is enhanced.

DETAILED DESCRIPTION OF THE PREFERRED EMBODIMENT

Figure 1:
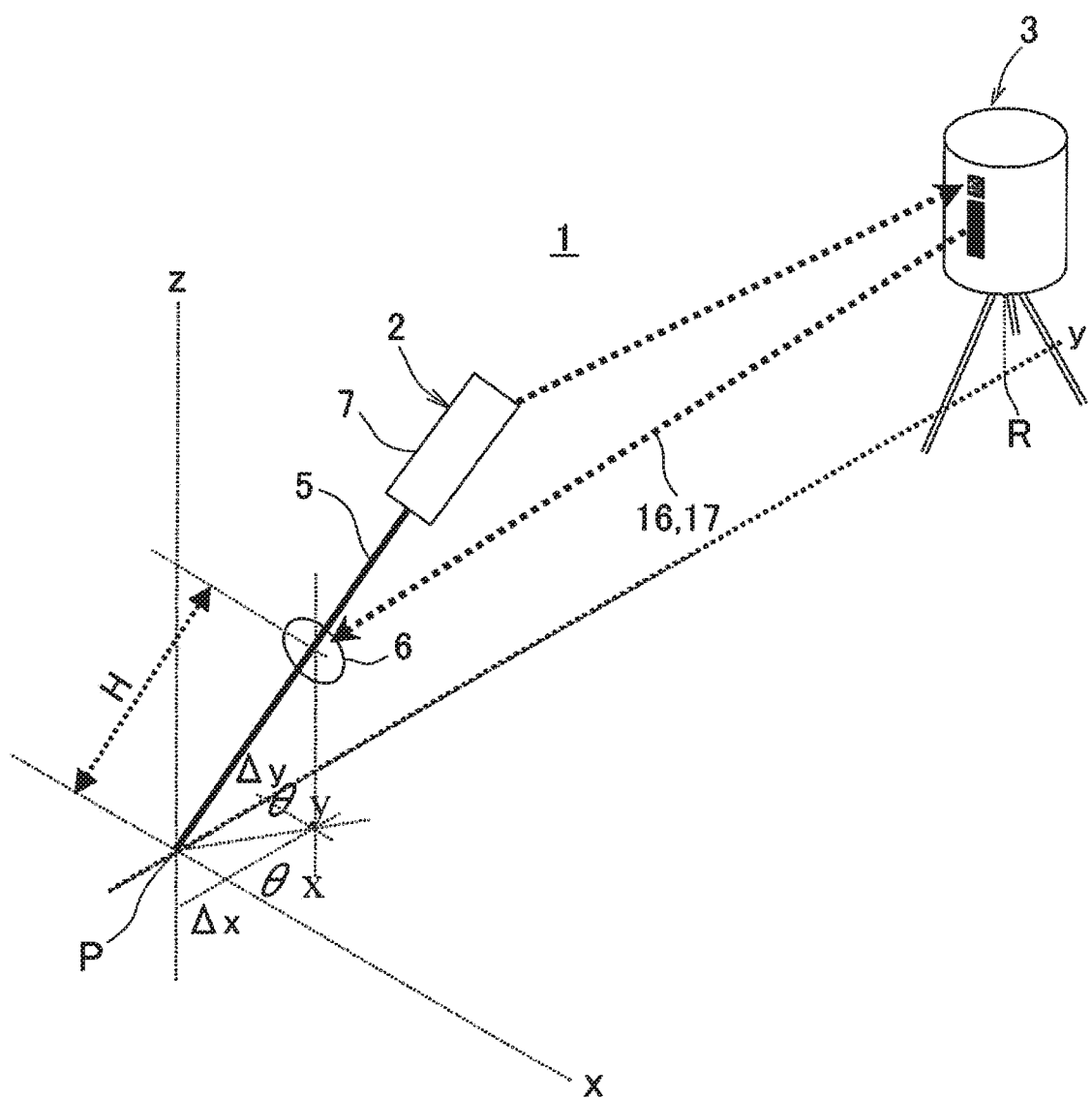
FIG. 1 is a schematical diagram showing an outline of an embodiment according to the present invention.

By referring to the drawings, a description will be given below on an embodiment of the present invention.

FIG. 1 shows a surveying system 1 according to an embodiment of the present invention and, in FIG. 1, a reference numeral 2 denotes a target instrument and a reference numeral 3 denotes a surveying instrument having a tracking function, e.g., a total station.

The total station 3 performs the three-dimensional measurement, and stores a measurement result in a built-in storage module. Further, the total station 3 may include a communication device and transmit a measurement result to the target instrument 2.

First, a description will be given on the target instrument 2.

A lower end part of a pole 5 is a ferrule, and a lower end of the ferrule is installed on a measuring point P. A prism (e.g., a corner cube or an all-around prism) 6 is provided at a predetermined distance (a known distance H) from the lower end of the ferrule, and a distance between an optical center of the prism 6 and the lower end of the pole 5 is known.

A terminal device 7 is horizontally or vertically provided on a predetermined position, e.g., an upper end of the pole 5. Further, the terminal device 7 is portable, and an attachment (not shown) may be attached to the pole 5 so that the terminal device 7 can be attached to or detached from the pole 5 via the attachment. Further, in a state where the terminal device 7 is attached to the pole 5, the terminal device 7 is fixed to the pole 5 and held with a known attitude.

Further, as the terminal device 7, a portable terminal device which is portable, for example, a smartphone or a tablet is used.

Figure 2:
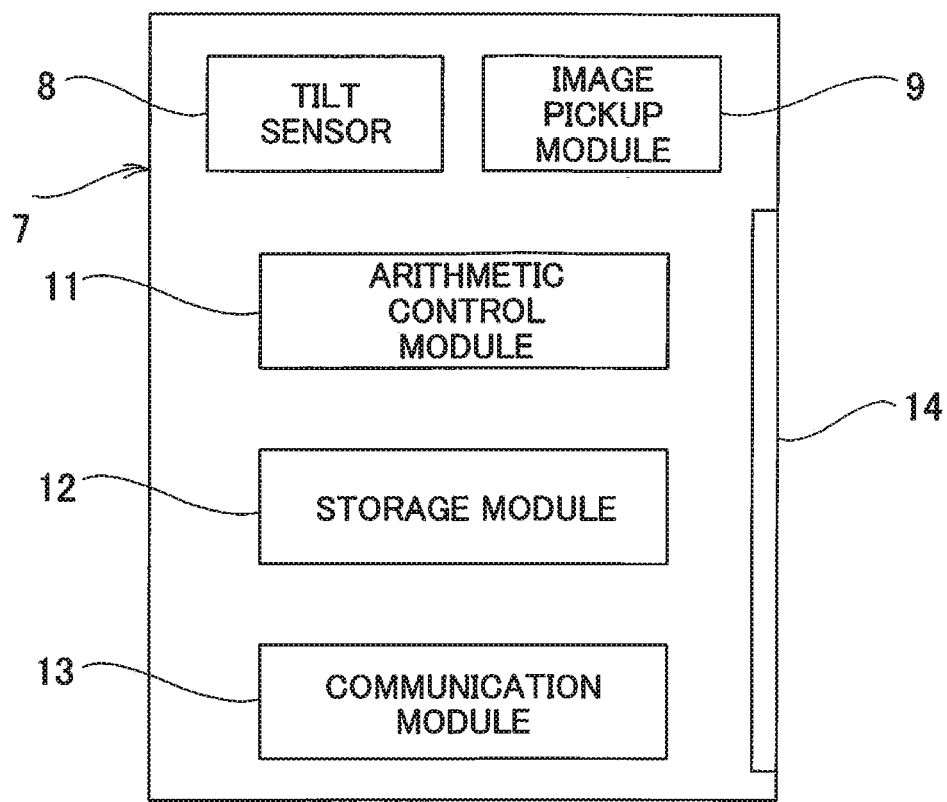
FIG. 2 is a schematical block diagram of a terminal device used in the embodiment.

The terminal device 7 will now be described with reference to FIG. 2.

The terminal device 7 mainly includes a tilt sensor 8, an image pickup module 9, an arithmetic control module 11, a storage module 12, a communication module 13, and a display unit 14.

The tilt sensor 8 can detect the tilts of the terminal device 7 in two axes (an X-axis, a Y-axis) to the horizontality, and the detection results are input to the arithmetic control module 11. One of the two axes of the tilt sensor 8 is parallel to an optical axis of the image pickup module 9. It is to be noted that the tilt sensor 8 may be configured to simply detect a tilt with respect to the verticality or the horizontality.

In a state where the image pickup module 9 is attached to the pole 5, the optical axis of the image pickup module 9 is parallel to an optical axis of the light which is reflected from the prism 6 and enters the total station 3. Further, the optical axis of the image pickup module 9 is orthogonal to an axis of the pole 5, and a distance D between the optical axis of the image pickup module 9 and an optical axis of the prism 6 is known. It is to be noted that if an intersection angle of the optical axis of the image pickup module 9 and the axis of the pole 5 is known, the optical axes do not have to be orthogonal to each other.

Further, a positional relationship and a distance between a reference position of the image pickup module 9, e.g., a center of an image pickup element (not shown) and the lower end of the pole 5 are also known. The image pickup module 9 can acquire a video image and a still image, and photographs an object which becomes a reference. For example, the image pickup module 9 photographs the total station 3 as a reference object.

The image pickup module 9 has an image pickup element (not shown) for acquiring an image, and a CCD, a CMOS, or the like constituted of an aggregation of the pixels is used as the image pickup element. The image pickup element is orthogonal (vertical) to the optical axis of the image pickup module 9, the image pickup element has a coordinate system, a position of each pixel in the image pickup element is identified by the coordinate system, and a light receiving signal from each pixel includes the positional information in the image pickup element, e.g., the coordinate data of the coordinate system having as an origin a point at which the optical axis of the image pickup module 9 passes through the image pickup element. Further, the coordinate axes orthogonal to each other in the coordinate system of the image pickup element are fixed to the pole 5, and have a know relationship to the axis of the pole 5. Preferably, one of the coordinate axes is parallel or orthogonal to the axis of the pole 5.

The image data output from the image pickup module 9 is constituted of light receiving signals output from the image pickup element. The image data is input to the arithmetic control module 11.

The arithmetic control module 11 is typified by a CPU, and may be a CPU specialized for this instrument or a general-purpose CPU. The arithmetic control module 11 develops and executes the later-described programs and performs measuring, signal processing, calculating, controlling, and others.

The communication module 13 can perform data communication of, e.g., image data or measurement data, and transmission/reception of data to/from the total station 3 may be enabled by the communication module 13.

The storage module 12 may be a semiconductor memory incorporated in the terminal device 7 or a memory card attachable to/detachable from the terminal device 7, or it may be an externally attachable storage device.

Various kinds of programs are stored in the storage module 12.

The programs include a display program configured to display the image data input from the image pickup module 9, the measurement data calculated by the arithmetic control module 11, or the like in the display unit 14, a program configured to identify the total station 3 based on an image acquired by the image pickup module 9 by the pattern recognition and calculate a position of the total station 3 in the image, a program configured to calculate a direction of the terminal device 7 with respect to the total station 3 based on the position of the total station 3 in the image, a program configured to divide a tilt angle with respect to the horizontality, which the tilt sensor 8 detects from a direction of the terminal device 7, into the tilt angles in two horizontal directions, a program configured to calculate movement amounts of the prism 6 (an optical center) in the two horizontal directions with respect to a measuring point P based on the tilt detection result from the tilt sensor 8 (or the tilt angles divided in the two horizontal directions) and the distance H, a program configured to correct a measurement result (the three-dimensional data) of the total station 3 about the prism 6 based on the movement amounts in the two horizontal directions and determine a position of the measuring point P, a communication program, and others.

A description will now be given below on a measuring action.

The total station 3 is installed on a reference point R. Since the total station 3 is subjected to the unmanned operation, the automatic operation or the remote-control operation is performed after installing the total station 3.

The target instrument 2 is installed on the measuring point P. The installation of the target instrument 2 on the measuring point P is completed by matching the lower end of the ferrule with the measuring point P and directing the prism 6 or the terminal device 7 toward the total station 3.

Even if the target instrument 2 tilts from the verticality, no correction is required in particular. Further, the operation of directing toward the total station 3 could be carried out as long as an image acquired by the image pickup module 9 is displayed in the display unit 14 and the total station 3 is included in the image.

It is to be noted that, here, a straight line connecting the reference point R with the measuring point P is a y-axis, a straight line which runs through the measuring point P and is orthogonal to the y-axis is an x-axis, and a straight line which runs through the measuring point P and is orthogonal (vertical) to the x-axis and the y-axis is a z-axis.

The distance measuring light 16 from the total station 3 is projected toward the prism 6, and the three-dimensional measurement (the distance measurement, the measurement of the angles which are a horizontal angle and an elevation angle) of the prism 6 is performed. It is to be noted that the tracking light 17 is projected together with the distance measuring light 16, and the prism 6 is tracked. The tracking may be performed before installing the target instrument 2 or the tracking may be started simultaneously with the start of the measurement.

The total station 3 transmits the measurement results to the target instrument 2 at the predetermined time intervals or in real time.

Figure 3:
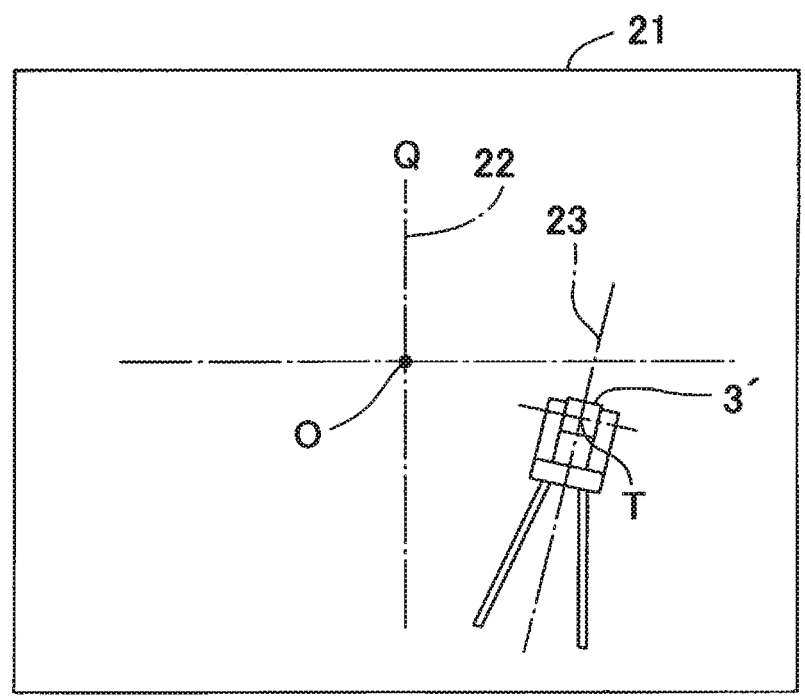
FIG. 3 is an explanatory drawing of an image displayed in a display unit of the terminal device.

With reference to FIG. 3, a description will be given on a case where a direction of the target instrument 2 to the total station 3 is calculated.

From an image acquired by the image pickup module 9, a FIG. 3' of the total station 3 in the image is extracted by the pattern recognition or the like, and a position of the FIG. 3' in the image is calculated.

It is to be noted that, in FIG. 3, a reference numeral 21 denotes an image displayed in the display unit 14, and a reference sign O designates a center of the image 21, i.e., a position of the optical axis of the image pickup module 9. Further, a position of the FIG. 3' in the image 21 corresponds to a position in an image element.

In the image 21, the crossing alternate long and short dash lines 22 represent a coordinate system Q having the 0 as an origin. Further, in the image 21, a reference numeral 23 denotes a vertical line running through the reference point R, and an intersection T on the vertical line 23 represents an optical axis of the total station 3.

When the optical axis of the image pickup module 9 coincides with the optical axis of the total station 3, the intersection of the alternate long and short dash lines 22 coincides with the intersection T in the image 21. That is, when the terminal device 7 faces the total station 3 and the target instrument 2 is vertical, the intersection of the alternate long and short dash lines 22 coincides with the intersection T.

In a state where the terminal device 7 faces the target instrument 2, when the target instrument 2 tilts in such a manner that the target instrument 2 recedes from the total station 3 (tilts toward a rear side), the FIG. 3' appears on a lower side of the image 21. Further, when the target instrument 2 tilts leftward to the total station 3, the FIG. 3' appears on a right side of the image 21. That is, a position of the FIG. 3', which appears in the coordinate system Q (a position of the optical axis of the total station 3), indicates a tilt angle and a tilt direction of the target instrument 2.

A up-and-down change in position of the FIG. 3' appears as a change in elevation angle $\alpha$ of the optical axis of the image pickup module 9 with respect to the horizontality, and hence a front-and-back tilt angle $\alpha$ of the target instrument 2 with respect to the verticality can be calculated based on the up-and-down change in position of the FIG. 3'.

Further, since a right-and-left change in position (a change in position in the horizontal direction) of the FIG. 3' in the image in a facing state appears as (a tilt angle $\beta$ in the left-and-right direction)×(H+D), and the right-and-left tilt angle $\beta$ of the target instrument 2 can be likewise calculated based on the right-and-left change in position of the FIG. 3'.

Thus, by acquiring a position of the FIG. 3' to the origin O in the image 21, a tilt angle of the target instrument 2 with respect to the verticality can be acquired in a state where the terminal device 7 faces the total station 3.

Further, the tilt angle $\alpha$ in the front-and-back direction and the tilt angle $\beta$ in the right-and-left direction of the target instrument 2 can be also detected by the tilt sensor 8. The tilt sensor 8 can detect the tilt angles in two axes orthogonal to each other, one axis is determined to be parallel to the optical axis of the image pickup module 9, and the other axis is determined as an axis which is orthogonal to the optical axis of the image pickup module 9 and extends in the horizontal direction.

Next, when the terminal device 7 has been in a vertical state and rotated around the axis of the pole 5 (when a direction of the terminal device 7 has changed around the axis of the pole 5), a position of the FIG. 3' changes. For example, when the target instrument 2 has rotated around the axis of the pole 5 at a $\gamma$ angle in a counterclockwise direction, the FIG. 3' moves rightward in the image, and an amount of this movement corresponds to a horizontal rotation angle $\gamma$ of the optical axis of the image pickup module 9. Thus, based on a displacement amount of the FIG. 3' in the image, the horizontal rotation angle $\gamma$ of the target instrument 2, that is, a change in direction of the target instrument 2 can be calculated.

In a state where the target instrument 2 is measured by the total station 3, an actual tilt of the target instrument 2 includes a front-and-back or right-and-left tilt of the target instrument 2. Further, the actual tilt of the target instrument 2 includes the rotation of the target instrument 2 around the axis of the pole 5 (a deviation of a direction from the total station 3). Thus, a displacement which appears in the image includes the tilt of the target instrument 2 and a change in direction of the target instrument 2.

The tilt sensor 8 detects the tilt angles in the two axial directions (an x-axis component, a y-axis component), and a synthetic tilt angle of the two axial directions represents a tilt angle $\theta$ of the axis of the pole 5 with respect to the verticality. In a state where this tilt angle $\theta$ is held, when the target instrument 2 is rotated around the axis, a direction of the tilt sensor 8 changes, and hence the x-axis component and the y-axis component change.

Contrarily, when the x-axis and the y-axis of the tilt sensor 8 deviate from the x-axis and the y-axis (see FIG. 1) in the measurement state (when the target instrument 2 rotates), the tilt angles (the x-axis component, the y-axis component) in the two axial directions detected by the tilt sensor 8 deviate from the x-axis component and the y-axis component in the x-axis direction and the y-axis direction in a measurement state. On the other hand, the synthetic tilt angle detected by the tilt sensor 8 is constant irrespective of a direction of the tilt sensor 8. Therefore, when the x-axis and the y-axis of the tilt sensor 8 are matched with the x-axis and the y-axis in the measurement state (the target instrument 2 is arranged to face the total station 3) and the x-axis component and the y-axis component detected by the tilt sensor 8 are corrected in such a manner that the synthetic angle becomes θ, the actual x-axis component and y-axis component of the target instrument 2 in the measurement state can be detected.

Figure 4:
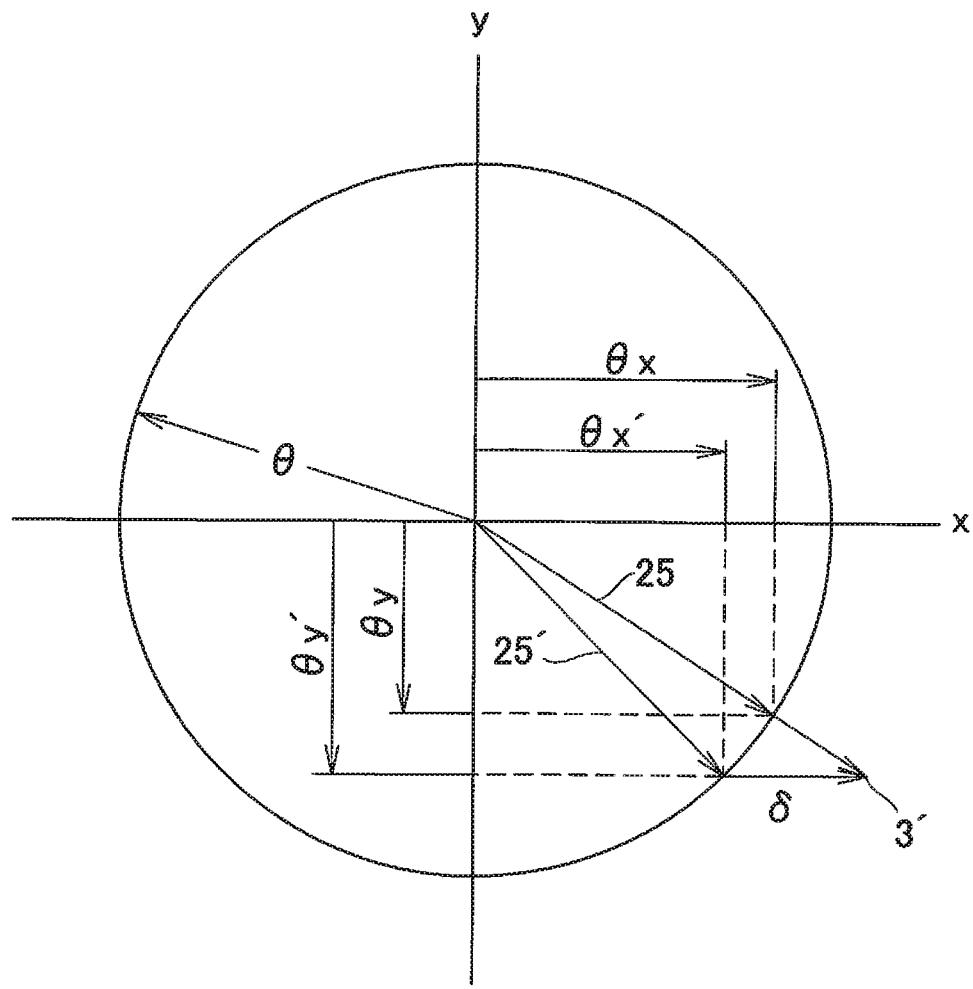
FIG. 4 is an explanatory drawing showing a relationship between a position of an object to be measured in an image and the tilt angles detected by a tilt sensor.

With reference to FIG. 4, a description will be further given. In FIG. 4, an x-axis and a y-axis correspond to the x-axis and the y-axis shown in FIG. 1. Further, it is assumed that an origin in the x-y coordinates in FIG. 4 corresponds to the origin O in the image in FIG. 3, and each tilt angle shown in the x-y coordinates corresponds to the displacement in FIG. 3.

A circle in FIG. 4 represents a synthetic angle θ obtained from the tilt angles of two axes detected by the tilt sensor 8.

First, assuming that the two axes of the tilt sensor 8 coincide with the x-axis and the y-axis in the measurement state, a tilt vector obtained from an x-axis component θx' and a y-axis component θy' detected by the tilt sensor 8 is represented by an arrow 25' in the drawing. Further, in the image 21, the FIG. 3' must appear at a position of a point of the arrow 25'.

On the other hand, when the target instrument 2 is rotating, the FIG. 3' in the image 21 appears at a position deviating from the position of the point of the arrow 25'. This deviation amount δ is caused by the rotation of the target instrument 2. Due to this deviation amount δ, the tilt vector 25' becomes a tilt vector 25, and a direction of the tilt vector changes. Since a change in direction of the tilt vector corresponds to a deviation between the x-axis and the y-axis of the tilt sensor 8 and the x-axis and the y-axis in the measurement state, the arithmetic control module 11 calculates the deviation of the x-axis and the y-axis of the tilt sensor 8 based on the deviation amount δ, and corrects the x-axis component θx' and the y-axis component θy' detected by the tilt sensor 8 to an x-axis component θx and a y-axis component θy of the x-axis and the y-axis in the measurement state based on the deviation amount. That is, the x-axis component θx' and the y-axis component θy' are corrected to tilt angles of the optical axis direction of the image pickup module 9 and a direction orthogonal to the optical axis.

For example, in order to correct the x-axis component θx' and the y-axis component θy' in a state where the tilt sensor 8 is deviating to the x-axis component and the y-axis component in a state where the target instrument 2 faces the total station 3, a tilt direction of the tilt sensor 8 shifts to a direction of the vector 25, and the values with which the synthetic angle of the x-axis component and the y-axis component becomes θ in the direction of the vector 25, namely, θx (a tilt angle θx) and θy (a tilt angle θy) are acquired.

Thus, it is possible to acquire the x-axis component θx (the tilt angle θx) and the y-axis component θy (the tilt angle θy) in a state where the target instrument 2 is not rotating, i.e., a state where the target instrument 2 faces the total station 3.

A description will now be given on the measurement of the measuring point P with reference to FIG. 1.

The three-dimensional coordinates of the prism 6 are measured by the total station 3.

A horizontal displacement amount (Hsinθ) of the prism 6 to the measuring point P is acquired based on the synthetic angle θ and the distance H from the lower end of the target instrument 2 to the prism 6.

Further, a displacement Δx of an x component with respect to the measuring point P can be acquired using (Hsinθ)×cosθx, and a displacement Δy of a y component with respect to the measuring point P can be acquired using (Hsinθ)×cosθy.

Thus, with the use of a measurement result of the three-dimensional coordinates of the prism 6, the synthetic angle θ, the tilt angle θx, and the tilt angle θy, the measuring point P can be determined.

Thus, the measuring point P can be accurately measured without accurately vertically supporting the target instrument 2 and without accurately arranging the target instrument 2 to face the total station 3.

In a case where the measurement of one measuring point P is completed and a measuring point shifts to a subsequent measuring point P, since the total station 3 tracks the prism 6, by installing the target instrument 2 on the subsequent measuring point, a measurement is capable of immediately starting.

It is to be noted that, in case of measuring the measuring point P based on a measurement result of the total station 3, the measurement result of the total station 3 may be transmitted to the target instrument 2, or a tilt measurement result may be transmitted to the total station 3, and the calculation of the measuring point P may be performed by the target instrument 2 or the total station 3 in real time during the measurement. Alternatively, a measurement result of a tilt angle and a distance measurement result of the prism 6 may be stored by each measuring point respectively, and the calculation may be carried out by a PC or the like after the completion of all the measurements.

Furthermore, in case of acquiring a displacement amount of the prism 6 with reference to the measuring point P, a distance measurement result of the total station 3 is not required. For example, based on each tilt angle of the target instrument 2 and a distance from the lower end of the target instrument 2 to the prism 6, the displacement amount of the prism 6 in the horizontal direction with reference to the measuring point P may be calculated by the arithmetic control module 11.

It is to be note that, in the above description, the total station 3 is imaged as a reference object, and a position of the total station 3 in an image is detected by the pattern recognition. On the other hand, the guide light which is coaxial with the distance measuring light or parallel to the distance measuring light may be emitted from the total station 3, the guide light may be received by the image pickup module 9, the guide light may be determined as a reference object, and a position of the guide light may be detected. Alternatively, the distance measuring light or the tracking light may be used in place of the guide light. Further, any measuring instrument having a tracking function can suffice, the measuring instrument is not restricted to the total station 3.

Further, the image pickup module 9 could be configured to enable detecting a tilt and a direction of the target instrument 2 from an acquired image. Therefore, the reference for detecting the tilt and the direction of the target instrument 2 does not have to be the total station 3, and something which can serve as the reference may be installed at a predetermined position or, if an object which can be the reference in a measuring direction is present, this object may be used as the reference object.

Further, since the target instrument 2 does not have to be vertically supported, it is possible to perform the measurement when the measuring point is a ceiling surface or a wall surface, or perform the measurement of a narrow part which a person cannot enter.

Further, the terminal device 7 can be connected to a wearable terminal as a display unit. As the wearable terminal, there is a head-up display or a glass type AR device, and using such a device enables improving the workability.

The invention claimed is:

1. A target instrument comprising: a pole which has a ferrule part at a lower end part thereof, a prism which is provided on said pole and provided at a known distance from a lower end of said pole, and a terminal device provided on said pole, wherein said terminal device comprises an image pickup module which is fixed with a known attitude with respect to said pole, a tilt sensor which detects tilts in two axial directions which are orthogonal to each other and one of which axial directions is parallel to an optical axis of said image pickup module, and an arithmetic control module, wherein said image pickup module has an image pickup element and is configured to acquire an image which includes a reference object as a reference provided at a predetermined position in a measuring direction, wherein said optical axis of said image pickup module is orthogonal to an axis of said pole and orthogonally passes through said image pickup element, said image pickup element has a coordinate system which has an origin point at which said optical axis passes through, a position in said image pickup element is identified by said coordinate system, one coordinate axis of said coordinate system is orthogonal or parallel to an axis of said pole, said tilt sensor is configured to detect tilt angles in two axial directions of the target instrument with respect to the verticality, and said arithmetic control module is configured to calculate a tilt direction of said target instrument from a position of a figure of said reference object in said image, to calculate a tilt direction of said target instrument based on tilt angles in the two axial directions of said tilt sensor, to acquire a deviation between the tilt direction of said target instrument acquired from said image and the tilt direction acquired from said tilt sensor by calculating said tilt angles in the two axial directions, and to correct the respective tilt angles in the two axial directions of said tilt sensor to tilt angles in directions parallel to said optical axis of said image pickup module and orthogonal to said optical axis based on said deviation in a state where the terminal device faces said reference object.

2. The target instrument according to claim 1, wherein said arithmetic control module is configured to calculate a displacement of said prism in a horizontal direction with respect to a lower end position based on the corrected tilt angles and the distance from the lower end of said pole.

3. The target instrument according to claim 1, wherein said terminal device is a smartphone.

4. A surveying system comprising said target instrument according to claim 1 and a surveying instrument with a tracking function, wherein said surveying system is configured to measure a lower end of said target instrument based on a measurement result of said prism by said surveying instrument, a tilt angle of said target instrument, and a distance from the lower end of said pole to said prism.

* * * * *